US010067400B1

(12) United States Patent
Foote et al.

(10) Patent No.: US 10,067,400 B1
(45) Date of Patent: Sep. 4, 2018

(54) NIGHT VISION COLOR USING FAST SWITCHING FILTERS HAVING CONTROL SIGNALS FOR CONTROLLING A WAVELENGTH RANGE OF LIGHT FILTERED BY A FILTER ASSEMBLY

(71) Applicant: Rockwell Collins, Inc., Cedar Rapids, IA (US)

(72) Inventors: Bobby D. Foote, Marion, IA (US); Jeffrey E. Crow, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 306 days.

(21) Appl. No.: 15/143,102

(22) Filed: Apr. 29, 2016

(51) Int. Cl.
*G02B 23/12* (2006.01)
*G02F 1/23* (2006.01)
*H04N 5/33* (2006.01)
*H04N 5/225* (2006.01)
*H04N 5/232* (2006.01)
*H04N 5/04* (2006.01)
*G02B 13/16* (2006.01)
*G02F 1/01* (2006.01)

(52) U.S. Cl.
CPC ............ *G02F 1/23* (2013.01); *G02B 13/16* (2013.01); *G02F 1/0121* (2013.01); *H04N 5/04* (2013.01); *H04N 5/2254* (2013.01); *H04N 5/23293* (2013.01); *H04N 5/33* (2013.01)

(58) Field of Classification Search
CPC ...... G02B 23/12; G02B 23/125; G02B 21/20; G02B 23/00; G02B 27/017; H04N 5/332
USPC ............................................ 250/214 VT, 226
See application file for complete search history.

(56) References Cited

U.S. PATENT DOCUMENTS 6,570,147 B2 * 5/2003 Smith .................... G02B 23/12
250/208.1

* cited by examiner

*Primary Examiner* — Que T Le
(74) *Attorney, Agent, or Firm* — Donna P. Suchy; Daniel M. Barbieri

(57) ABSTRACT

A system includes an objective lens, a viewing device, a control circuit, a first filter assembly, a light amplification assembly, and a second filter assembly. The control circuit is configured to transmit control signals for controlling a wavelength range of light filtered by a filter assembly. The first filter assembly is optically coupled to the objective lens, and is configured to receive light via the objective lens and filter the light into a first filtered light of a first wavelength range based on a first control signal received from the control circuit. The light amplification assembly is optically coupled to the first filter assembly, and is configured to receive the first filtered light and amplify the first filtered light into amplified light. The second filter assembly is optically coupled to the light amplification assembly and to the viewing device, and is configured to receive the amplified light, filter the amplified light into second filtered light of a second wavelength range based on a second control signal received from the control circuit, the second wavelength range corresponding to the first wavelength range, and output the second filtered light to the viewing device.

20 Claims, 3 Drawing Sheets

NIGHT VISION COLOR USING FAST SWITCHING FILTERS HAVING CONTROL SIGNALS FOR CONTROLLING A WAVELENGTH RANGE OF LIGHT FILTERED BY A FILTER ASSEMBLY

BACKGROUND

The present disclosure generally relates to analog night vision devices. Analog night vision devices, including monoculars and binoculars, can provide monochrome night vision in low light environments, such as by using an image intensifier with a green phosphor or white phosphor screen to increase the intensity of ambient light. It may be difficult for a user to distinguish objects perceived through an analog night vision device in monochrome, and digital color processing electronics is generally not useful with analog night vision devices.

SUMMARY

In one aspect, embodiments of the inventive concepts disclosed herein are directed to a system for night vision color. The system includes an objective lens, a viewing device, a control circuit, a first filter assembly, a light amplification assembly, and a second filter assembly. The control circuit is configured to transmit control signals for controlling a wavelength range of light filtered by a filter assembly. The first filter assembly is optically coupled to the objective lens, and is configured to receive light via the objective lens and filter the light into a first filtered light of a first wavelength range based on a first control signal received from the control circuit. The light amplification assembly is optically coupled to the first filter assembly, and is configured to receive the first filtered light and amplify the first filtered light into amplified light. The second filter assembly is optically coupled to the light amplification assembly and to the viewing device, and is configured to receive the amplified light, filter the amplified light into second filtered light of a second wavelength range based on a second control signal received from the control circuit, the second wavelength range corresponding to the first wavelength range, and output the second filtered light to the viewing device.

In a further aspect, embodiments of the inventive concepts disclosed herein are directed to a method of providing night vision color. The method includes receiving light at a first filter assembly optically coupled to an objective lens via the objective lens. The method includes filtering the received light by the first filter assembly into a first filtered light of a first wavelength range based on a first control signal. The method includes receiving the first filtered light at a light amplification assembly optically coupled to the first filter assembly and amplifying the first filtered light into amplified light. The method includes receiving the amplified light at a second filter assembly optically coupled to the light amplification assembly. The method includes filtering the amplified light by the second filter assembly into second filtered light of a second wavelength range based on a second control signal, the second wavelength range corresponding to the first wavelength range. The method includes outputting the second filtered light to a viewing device optically coupled to the second filter assembly.

In a further aspect, embodiments of the inventive concepts disclosed herein are directed to a night vision color assembly. The night vision color assembly includes a control circuit, a first filter assembly, and a second filter assembly. The control circuit is configured to transmit control signals for controlling a wavelength range of light filtered by a filter assembly. The first filter assembly is configured to be optically coupled to an objective lens of a night vision device, and is configured to receive light via the objective lens and filter the light into a first filtered light of a first wavelength range based on a first control signal received from the control circuit. The second filter assembly is optically coupled to a light amplification assembly of a night vision device, the light amplification assembly configured to amplify the first filtered light, and to a viewing device of the night vision device, and is configured to receive the amplified light, filter the amplified light into second filtered light of a second wavelength range based on a second control signal received from the control circuit, the second wavelength range corresponding to the first wavelength range, and output the second filtered light to the viewing device.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
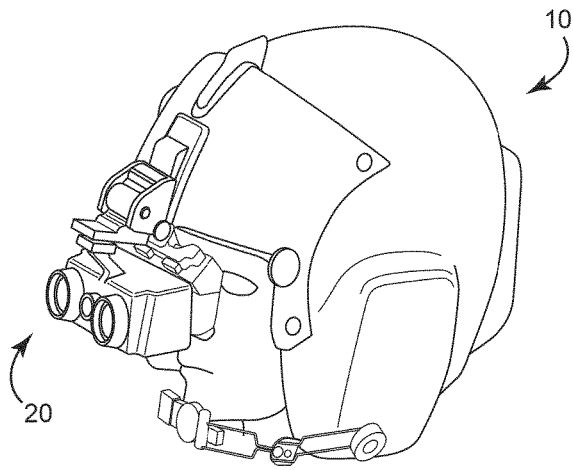
FIG. 1 is a perspective view of an exemplary embodiment of a helmet with a head mounted display according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems, apparatuses, and methods for night vision color, including for using night vision color with analog night vision devices (e.g., analog night vision devices using white phosphor). In some embodiments, a system for night vision color includes an objective lens, a viewing device (e.g., an eyepiece), a control circuit, a first filter assembly, a light amplification assembly, and a second filter assembly. The control circuit is configured to transmit control signals for controlling a wavelength range of light filtered by a filter assembly. The first filter assembly is optically coupled to the objective lens, and is configured to receive light via the objective lens and filter the light into a first filtered light of a first wavelength range based on a first control signal received from the control circuit. The light amplification assembly is optically coupled to the first filter assembly, and is configured to amplify the first filtered light into amplified light. The second filter assembly is optically coupled to the light amplification assembly and to the eyepiece, and is configured to receive the amplified light, filter the amplified light into second filtered light of a second wavelength range based on a second control signal received from the control circuit, the second wavelength range corresponding to the first wavelength range, and output the second filtered light to the viewing device. The control circuit can transmit control signals at timings such that the first wavelength range and the second wavelength range correspond to one another (e.g., are coordinated, are synchronized).

In some embodiments, the system can provide color to an analog night vision device, such as an analog night vision device using white phosphor or green phosphor, by generating the control signals such that the timings of filtering by the filter assemblies allows a user of the night vision device to perceive color (e.g., perceive light having wavelengths within a visible spectrum). In some embodiments, the filtering assemblies can switch between filters at a fast enough refresh rate such that a user perceives integrated color even as multiple filters corresponding to multiple wavelength ranges are used. For example, the first filter assembly can filter received light to pass red light, such as by opening a red filter, and the second filter assembly can also open a red filter at a timing corresponding to the first filter assembly opening a red filter such that a user perceiving light through the system perceives red light. The system can be configured to switch between wavelength ranges at a fast enough rate such that a viewer perceiving light transmitted by the system does not perceive the colors sequentially, but instead integrates light of the multiple wavelength ranges (e.g., light of multiple color channels such as a red channel, green channel, and blue channel) into a single full color display. In some embodiments, the system is configured for hyperspectral operation. For example, the first filter assembly can be configured to filter light into more wavelength ranges than a red range, a blue range, and a green range. In embodiments in which the system is configured for hyperspectral operation, the system can be based on white phosphor or green phosphor.

In some embodiments, the system can provide light information to a viewer based on light outside of a visible spectrum, such as by configuring the first filter assembly to filter light having wavelengths outside of a visible spectrum, while configuring the second filter assembly to filter light to wavelengths within a visible spectrum. For example, the first filter assembly can be configured to filter light of a wavelength range of 1000 nm-1200 nm based on a first control signal, and the second filter assembly, which is optically coupled to the output of the light amplification assembly such that it receives amplified light (which has been filtered to a range of 1000 nm-1200 nm by the first filter assembly and amplified by the light amplification assembly), can be configured to filter the amplified light at a corresponding timing to second filtered light of a wavelength range of 600 nm-699 nm, such that a user can perceive the second filtered light as a "red" color, even as the first filtered light was of a wavelength range outside of the visible spectrum. The first filter assembly can be configured for various wavelength ranges (e.g., spectrums) including near infrared, short wave infrared, mid wave infrared, long wave infrared, and ultraviolet wavelength ranges. The first filter assembly can be configured to receive and filter laser designator light, and the second filter assembly can be configured corresponding provide filtered visible light having a perceived color recognizable by a user (e.g., the laser designator light can be perceived as green).

In some embodiments, the filters and control circuit components of the system are integrated with the night vision components (e.g., integrated with the objective lens and the eyepiece). In some embodiments, the filters and control circuit components of the system are integrated with the input and output of the light amplification assembly (e.g., of an image intensifier tube of the light amplification assembly). In some embodiments, the filters and control circuit are configured to be retrofitted to an existing night vision device (e.g., the filters can be retrofitted to be optically coupled to the objective lens and to the eyepiece).

Referring now to FIG. 1, an embodiment of a helmet 10 according to the inventive concepts disclosed herein includes a head mounted display (HMD) 20. The helmet 10 can be worn by a variety of operators, such as a pilot, and can provide information to the pilot via the HMD 20. For example, the HMD 20 can include features of the inventive concepts disclosed herein, such as a system for night vision color that allows an operator to perceive color with night vision in low light conditions. As shown in FIG. 1, the HMD 20 includes a binocular analog night vision device. In various embodiments, HMDs or other devices including features of the inventive concepts disclosed herein can be provided as monocular devices (e.g., a handheld monocular analog night vision device).

Figure 2A:
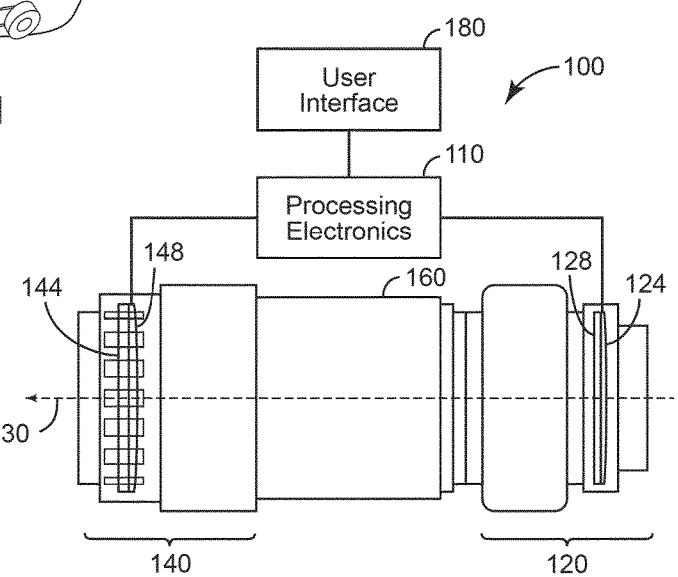
FIG. 2A is a block diagram of an exemplary embodiment of a color night vision system according to the inventive concepts disclosed herein.

Referring now to FIG. 2, an exemplary embodiment of a color night vision system 100 according to the inventive concepts disclosed herein is illustrated. In brief overview, the color night vision system 100 includes processing electronics 110 (e.g., a control circuit), an objective assembly 120, an eyepiece assembly 140, and a light amplification assembly 160 (e.g., an image intensifier tube, a light tube). The processing electronics 110 can be configured to generate and transmit control signals to control filter assemblies, such as to control which filter of a filter assembly is opened, to control a wavelength range of light filtered by and/or passed through a filter assembly, to control timing of filtering by a filter assembly. Light can be received, amplified, filtered, or otherwise modified, and transmitted to a viewer by the color vision system 100 along a light path 30. While FIG. 2 illustrates a straight line light path, in various embodiments, the light path can deviate from a straight line, such as by orienting various optically coupled components of the color night vision system 100 away from a straight line orientation (e.g., using mirrors to direct light between optically coupled components).

The objective assembly 120 can be configured to receive light from a remote source and filter the received light (e.g., selectively transmit light of desired wavelengths). In some embodiments, the objective assembly 120 includes an objective lens 124 and a first filter assembly 128. The objective lens 124 can be configured to receive and focus light from a remote source, such as light in an ambient environment.

The first filter assembly 128 can be optically coupled to the objective lens 124. For example, the first filter assembly 128 can be fit on the objective lens 124. The first filter assembly 128 can be configured to filter light, such as by receiving light having photons of various wavelengths, and only allowing light to pass through (e.g., transmitting) having certain wavelengths. For example, the first filter assembly 128 can be configured to receive light having photons of wavelengths between 200 nm and 1200 nm, and transmit only those photons of wavelengths between 400 nm and 600 nm. Various other wavelength ranges or bands can also be filtered and transmitted.

In some embodiments, the first filter assembly 128 includes a plurality of filters corresponding to different wavelength ranges. For example, the first filter assembly 128 can be configured to open a first filter to transmit light having photons of wavelengths of a first wavelength range, open a second filter to transmit light having photons of wavelengths of a second wavelength range, open a third filter to transmit light having photons of wavelengths of a third wavelength range, etc. In some embodiments, the filters are positioned sequentially along the light path 30. In some embodiments, the first filter assembly 128 is electronically coupled to the processing electronics 110, such that the first filter assembly 128 can receive a first control signal from the processing electronics 110 and determine which filter to use (e.g., open, activate, cause to filter light) based on the first control signal. In some embodiments, each filter of the first filter assembly 128 is electronically coupled to the processing electronics 110, allowing for simultaneous control of filters. In some embodiments, the first filter assembly 128 includes processing electronics configured to receive the first control signal and determine which filter to control based on the first control signal. The wavelength ranges can vary in size. For example, the wavelength ranges can be on the order <1 nm, 1 nm, 10 nm, 100 nm. In some embodiments, the wavelength ranges are discrete, such that there are gaps between wavelength ranges (e.g., the first filter assembly 128 include filters having wavelength ranges with gaps of 25 nm, such as wavelength ranges of 400 nm-450 nm, 475 nm-525 nm, 550 nm-600 nm; the gaps may vary in magnitude depending on the filters selected).

In some embodiments, the first filter assembly 128 is configured to operate at a refresh rate (e.g., a rate at which filters of the first filter assembly 128 can be changed) above a minimum threshold. The minimum threshold can be a threshold value below which a user perceiving light from the color night vision system 100 can separately perceive colors filtered by the color night vision system 100. In some embodiments, the minimum threshold is 60 Hz. In some embodiments, the minimum threshold is 100 Hz. In some embodiments, the refresh rate is greater than or equal to 200 Hz. In some embodiments, the refresh rate is greater than or equal to 360 Hz. In some embodiments, the refresh rate is greater than or equal to 360 Hz and less than or equal to 1 KHz. For example, the first filter assembly 128 can be configured to operate at a refresh rate of 360 Hz. In some embodiments, there may be a delay between when one filter is opened and when another filter is subsequently opened based on a control signal from the processing electronics 110. Even if the minimum threshold below which a user can separately perceive colors is 60 Hz, the number of filters and/or the delay between opening of filters may require the refresh rate to be much higher (e.g., 360 Hz), such that the duration of a cycle between each of the filters (e.g., a red-green-blue cycle) is still less than a duration corresponding to the minimum threshold.

In some embodiments, the first filter assembly 128 is configured to filter light into wavelength ranges corresponding to one or more portions of a visible spectrum. For example, the first filter assembly 128 can be configured to filter light into a red range, a blue range, and a green range. A visible spectrum can include light having photons of wavelengths of approximately 380 nm to 750 nm (e.g., wavelengths of 400 nm to 700 nm).

In some embodiments, the first filter assembly 128 is configured to filter light into first filtered light of the first plurality of wavelength ranges such that the color night vision system 100 is configured for hyperspectral operation. For example, the first filter assembly 128 can include four or more filters corresponding to different wavelength ranges, and selectively transmit light corresponding to the four or more wavelength ranges.

In some embodiments, the first filter assembly 128 is configured to filter light based on a first control signal received from the processing electronics 110. For example, the first filter assembly 128 can receive the first control signal, determine a filter or a wavelength range of light to be transmitted as indicated by the first control signal, and select the filter (e.g., by changing between filters) as indicated by the first control signal to transmit light of the corresponding wavelength range.

The eyepiece assembly 140 can be configured to output light for viewing to a user. In some embodiments, the eyepiece assembly 140 includes a viewing device 144 and a second filter assembly 148. The viewing device 144 (e.g., an eyepiece, a viewing lens, etc.) can be configured to pass or output (e.g. transmit) light from the second filter assembly 148 to a viewer, such as an operator of the color night vision system 100. The viewing device 144 can be configured to focus light.

The second filter assembly 148 can be configured to be optically coupled to the first filter assembly 128 (e.g., optically coupled to the first filter assembly 128 via the light amplification assembly 160) and the viewing device 144. The second filter assembly 148 can be similar or identical in structure to the first filter assembly 128 and perform similar functions as the first filter assembly 128. The second filter assembly 148 can receive first filtered light from the first filter assembly 128 (and can receive the first filtered light as amplified light when the light amplification assembly 160 amplifies the first filtered light). The second filter assembly 148 can receive a second control signal from the processing electronics 110 and filter light based on the second control signal.

In some embodiments, the night vision system 100 includes a light amplification assembly 160 (e.g., a light amplification assembly that is or includes an image intensifier tube, a light tube). The light amplification assembly 160 can be optically coupled to the objective assembly 120 and the eyepiece assembly 140. For example, first filtered light transmitted from the first filter assembly 128 of the objective assembly 120 can pass through the light amplification assembly 160 into the eyepiece assembly 140. The light amplification assembly 160 can be configured to amplify intensity of light received from the objective assembly 120. For example, the light amplification assembly 160 can be configured to convert photons of received light into electrons, amplify the number of electrons based on a gain, and output photons corresponding to the gain and the amplified electrons. For example, the light amplification assembly 160 can be configured to amplify the intensity of the first filtered light filtered by the first filter assembly 128. In some embodiments, the processing electronics 110 are configured to transmit at last one of the first control signal or the second control signal at timings based on gain information indication an amplification by the light amplification assembly 160 of light received by the objective lens 120.

In some embodiments, the light amplification assembly 160 can be configured for automatic gain control, such as by determining the gain based on ambient light intensity. For example, the night vision system 100 can include a light sensor (not shown) configured to detect an ambient light intensity and output an intensity signal corresponding to the ambient light intensity, and the light amplification assembly 160 can be configured to determine the gain for amplification of light based on the intensity signal.

In some embodiments, the light amplification assembly 160 can be configured for manual gain control. For example, the light amplification assembly 160 or other components of the night vision system 100 can include a user input device configured to receive user input indicating a desired gain, and the light amplification assembly 160 can receive the user input and determine the gain for amplification of light based on the user input.

In some embodiments, the color night vision system 100 includes a user interface 180. The user interface 180 can be configured to receive user input indicating instructions from a user, such as instructions for a mode of operation of the color night vision system 100. For example, the user input can indicate instructions to operate the color night vision system 100 in a red-green-blue mode of operation, in a hyperspectral mode of operation, in a fully transmissive state mode of operation, or any other mode of operation as described herein. In some embodiments, the user input can indicate an ambient brightness, such as an ambient brightness corresponding to amplification by the light amplification assembly 160. In some embodiments, the user interface 180 includes user input devices (e.g., buttons, switches, dials, keys) configured to receive the user input.

In some embodiments, the processing electronics 110 are configured to generate the first control signal for controlling operation of the first filter assembly 128 and the second control signal for controlling operation of the second filter assembly 148. The first control signal can cause the first filter assembly 128 to open, activate, change between, or otherwise enable a filter of the first filter assembly 128 to operate on light received by the first filter assembly 128. The second control signal can be similar to the first control signal, depending on the filtering functions of the second filter assembly 148 relative to the first filter assembly 128.

In some embodiments, the processing electronics 110 are configured to transmit the second control signal at a reference delay relative to the first control signal. The reference delay can be based on a time required for the first filtered light to travel from the first filter assembly 128 to the second filter assembly 148. The reference delay can be based on one or more of a distance between the first filter assembly 128 and the second filter assembly 148 and an effective speed of light between the first filter assembly 128 and the second filter assembly 148 (e.g., an effective speed of light accounting for amplification or other modifications of the first filtered light by the light amplification assembly 160). The reference delay can be based on times required for each of the first filter assembly 128 and the second filter assembly 148 to receive the corresponding control signal, process the corresponding control signal, and cause a filter to open (or otherwise be enabled to operate on light) based on the corresponding control signal. In some embodiments, the color night vision system 100 is configured for one-to-one synchronization of the first control signal and the second control signal. For example, the first control signal can be transmitted at a first time, and the second control signal can be transmitted at a second time that is a sum of the first time and the reference delay.

In some embodiments, the processing electronics 110 are configured to transmit at least one of the first control signal or the second control signal to the first filter assembly at timings determined based on gain information indicating an amplification by the light amplification assembly 160. For example, amplification by the light amplification assembly 160 can be inversely proportional to a brightness of an ambient environment and/or an intensity of light received by the color night vision system. In addition, as brightness of the ambient environment and/or intensity of light received increases, fewer samples of light are required for each wavelength range, allowing the filters to be changed more frequently.

In some embodiments, the processing electronics 110 receive gain information from the light amplification assembly 160 (or a night vision device including the light amplification assembly 160), and generate control signals based on the received gain information. For example, if the gain information indicates a relatively high (or relatively low) ambient brightness, then the generated control signals can include instructions to operate the filter assemblies at a relatively low (or relatively high) refresh rate. In some embodiments, the processing electronics 110 can receive an indication of ambient brightness (or intensity of light received by the color night vision system 100), and perform a lookup in a lookup table associating gain information with ambient brightness to retrieve the gain information. In some embodiments, the processing electronics 110 can retrieve timing information from a lookup table based on the gain information.

Figure 2B:
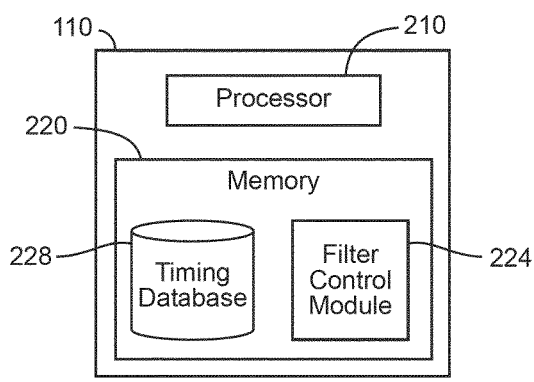
FIG. 2B is a detailed block diagram of an exemplary embodiment of processing electronics of a color night vision system according to the inventive concepts disclosed herein.

Referring now to FIG. 2B, an exemplary embodiment of the processing electronics 110 according to the inventive concepts disclosed herein includes a processor 210 and a memory 220. The processor 210 and memory 220 can be used to execute computer code stored in the memory 220 to complete and facilitate the activities described herein, including activities described as being performed by the processing electronics 110. The processor 210 may be implemented as a specific purpose processor, an application specific integrated circuit ("ASIC"), one or more field programmable gate arrays ("FPGAs"), a group of processing components, or other suitable electronic processing components. Any controllers and modules described herein may be implemented as a hardware circuit comprising custom VLSI circuits or gate arrays, off-the-shelf semiconductors such as logic chips, transistors, or other discrete components, and may be implemented in programmable hardware devices such as field programmable gate arrays, programmable array logic, programmable logic devices or the like. The memory 220 is one or more devices (e.g., RAM, ROM, flash memory, hard disk storage) for storing data and/or computer code for completing and/or facilitating the various user or client processes, layers, and modules described in the present disclosure. The memory 220 may be or include volatile memory or non-volatile memory and may include database components, object code components, script components, or any other type of information structure for supporting the various activities and information structures of the present disclosure. The memory 220 is communicably connected to the processor 210 and includes computer code or instruction modules for executing one or more processes described herein, such as for execution by the processor 210.

For example, as shown in FIG. 2B, the memory 220 can include a filter control module 224 and a timing database 228. The filter control module 224 can be configured to process data such as user inputs (e.g., user inputs received from the user interface 180), gain information received from the light amplification assembly 160, and/or timing information retrieved from the timing database 228, and generate control signals for transmission to the first filter assembly 128 and/or the second filter assembly 148 based on the processed data. In some embodiments, the filter control module 224 can receive information indicating an ambient brightness (or an intensity of light received by the color night vision system 100) and perform a lookup in a lookup table of gain information stored in the timing database 228 to retrieve the gain information. In some embodiments, the filter control module 224 can retrieve timing information indicating timings for control signals from the timing database 228 based on the gain information. In some embodiments, the filter control module 224 can receive gain information from the light amplification assembly 160 (or from a night vision device including the light amplification assembly 160). In some embodiments, the filter control module 224 can retrieve timing information based on the user inputs. In some embodiments, the filter control module 224 can retrieve instructions for generating control signals based on user inputs indicating a desired mode of operation of the color night vision system 100.

In some embodiments, the first filter assembly 128 is further configured filter the light received via the objective lens 124 into first filtered light of one of a first plurality of first wavelength ranges based on the first control signal, and the second filter assembly 148 is further configured to filter the first filtered light into second filtered light of one of a second plurality of second wavelength ranges based on the second control signal. For example, if the color night vision system 100 is configured for operation with red, green, and blue filters, such that a viewer can perceive color throughout the visible spectrum, the first filter assembly 128 and the second filter assembly 148 can be configured to filter received light into one of red, green, or blue wavelength ranges based on the corresponding control signals.

In some embodiments, one or both of the first filter assembly 128 and the second filter assembly 148 can be configured to operate in a fully transmissive state. The fully transmissive state may be beneficial in extremely low-light ambient environments. The first filter assembly 128 and/or the second filter assembly 148 can be configured to operate in a state in which each filter of the corresponding filter assembly is open, deactivated, removed from the light path 30, or otherwise not used such that the corresponding filter assembly does not filter any received light, instead allowing all received light to be transmitted. In some embodiments, the first filter assembly 128 and/or the second filter assembly 148 can receive a respective control signal indicating instructions to operate in a fully transmissive state, and can operate in a fully transmissive state based on the control signal.

In some embodiments, a width of a first wavelength range filtered by the first filter assembly 128 is different from a width of a second wavelength range filtered by the second filter assembly 148. For example, the first wavelength range can be relatively narrow, and the corresponding light can be displayed as a specific color based on a second control signal transmitted to control the second filter assembly 148.

In some embodiments, the second filter assembly 148 can be configured to transmit light in one of a plurality of color palettes based on an object discrimination requirement. In some embodiments, the plurality of color palettes are associated with the wavelength ranges of filters of the second filter assembly 148. For example, the second filter assembly 148 can include filters associated with wavelength ranges of 450 nm-495 nm, 495 nm-570 nm, 620 nm-650 nm, and 650 nm-750 nm, and each color palette of the plurality of color palettes can be associated with two or more of the wavelength ranges. In some embodiments, the plurality of color palettes are associated with combinations of wavelength ranges of filters of the second filter assembly 148. For example, the second filter assembly 148 can include filters associated with a red wavelength range, a green wavelength range, and a blue wavelength range, and each color palette of the plurality of color palettes can be associated with timings for combining the various wavelength ranges (e.g., a color palette can include an orange color by opening a red filter for twice as long as a green filter).

In some embodiments, the color palette is determined based on user input indicating a requested color palette received at the user interface 180. For example, the processing electronics 110 can receive the user input, determine the requested color palette based on the user input, and generate and transmit a second control signal to the second filter assembly 148 based on the requested color palette. The requested color palette may relate or correspond to expected colors of objects in an ambient environment, so as to facilitate discrimination of objects based on the expected colors. For example, a friend or foe discrimination may be based on distinguishing a first color of a friend object from a second color of a foe object, and the color palette may correspond to the first color and the second color.

In some embodiments, at least one of the first filter assembly 128 or the second filter assembly 148 is configured to output (e.g., transmit) the corresponding first filtered light or second filtered light in at least two discrete wavelength ranges, and the processing electronics 110 is further configured to generate the corresponding first control signal or second control signal such that a wavelength of a perceived color of the light transmitted by the 148 second filter assembly is not included in either of the at least two discrete wavelength ranges. For example, control signals can be generated such that red light is transmitted for twice as long as green light, such that a viewer perceives orange light.

Figure 3:
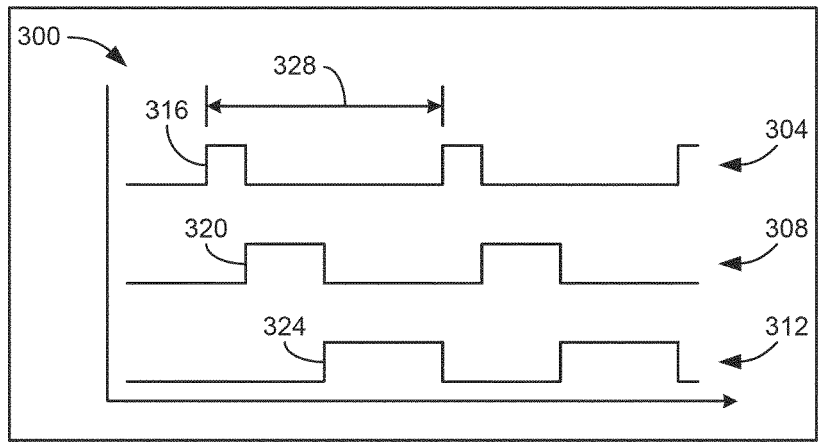
FIG. 3 is a schematic diagram of an exemplary embodiment of a timing scheme according to the inventive concepts disclosed herein.

Referring now to FIG. 3, an exemplary embodiment of a timing scheme 300 according to the inventive concepts disclosed herein is illustrated. The timing scheme 300 includes timings for transmitting control signals to a filter assembly (e.g., first filter assembly 128, second filter assembly 148). As shown in FIG. 3, control signals can be transmitted to a filter assembly for filtering light into a first wavelength range 304, a second wavelength range 308, and a third wavelength range 312 (e.g., red, green, and blue wavelength ranges). A first timing control signal 316 is transmitted for a first duration to cause a first filter corresponding to the first wavelength range 304 to open (or otherwise be enabled to operate on light received by the filter assembly). A second timing control signal 320 is transmitted for a second duration to cause a second filter corresponding to the second wavelength range 308 to open (or otherwise be enabled to operate on light received by the filter assembly). A third timing control signal 324 is transmitted for a third duration to cause a third filter corresponding to the third wavelength range 312 to open (or otherwise be enabled to operate on light received by the filter assembly). A total duration 328 for the timing control signals 316, 320, and 324 (e.g., corresponding to a cycle from transmission of control signals to a first filter corresponding to the first wavelength range 304) can correspond to a refresh rate of the filter assembly. For example, if the total duration 328 is approximately 2.8 ms, then the refresh rate of the filter assembly will be approximately 360 Hz; in some embodiments, if the filters are sequentially controlled, then the refresh rate of the filter assembly will correspond to the shortest duration of the timing control signal transmitted to the filters. As shown in FIG. 3, the durations of the timing control signals can be varied. For example, the durations of the timing control signals can be varied to achieve color balance, such as color balance based on ambient brightness.

Figure 4A:
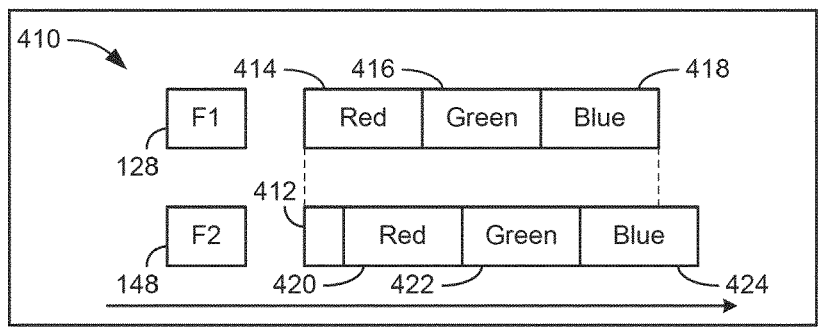
FIGS. 4A-4D are schematic diagrams of an exemplary embodiment of modes of operation of color night vision systems and apparatuses according to the inventive concepts disclosed herein.

Referring now to FIGS. 4A-4D, exemplary embodiments of individual cycles of timing schemes for various modes of operation are illustrated according to the inventive concepts disclosed herein. The modes of operation can be for controlling a first filter assembly 128 and a second filter assembly 148 as described herein. As shown in FIG. 4A, in a first mode of operation 410, the first filter assembly 128 and second filter assembly 148 are configured to operate with red, green, and blue wavelength ranges (e.g., the filter assemblies 128, 148 include filters that selectively transmit light of red, green, and blue wavelength ranges). The first filter assembly 128 receives timing control signals 414, 416, and 418 for transmitting light of red, green, and blue wavelength ranges, respectively. The second filter assembly 148 receives timing control signals 420, 422, and 424, for transmitting light of red, green, and blue wavelength ranges, respectively. The timing control signals 420, 422, and 424 are delayed by a reference delay 412 relative to the timing control signals 414, 416, and 418. As shown in FIG. 4A, in the first mode of operation 410, the wavelength ranges filtered and transmitted by the filter assemblies 128, 148 can be synchronized. For example, red first filtered light transmitted by the first filter assembly 128 can be received by the second filter assembly 148 after the reference delay, such that the red filter of the second filter assembly 148 is open to receive all of the red first filtered light.

Figure 4B:
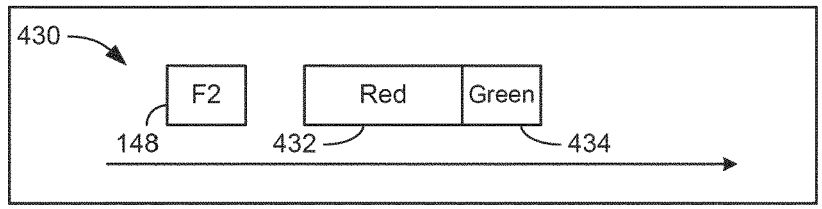

As shown in FIG. 4B, in a second mode of operation 430, a filter assembly (e.g., second filter assembly 148 as shown) can be configured to combine discrete wavelength ranges in order to transmit light that can be perceived to be of a different wavelength range not included in the discrete wavelength ranges. For example, the second filter assembly 148 can be configured to filter light into a red wavelength range 432 for twice as long as a green wavelength range 434, such that a user perceives second filtered light transmitted by the second filter assembly 148 as orange.

Figure 4C:
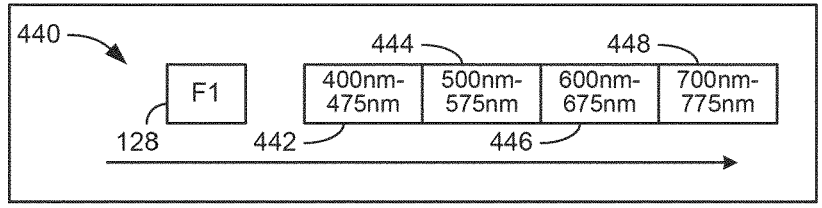

As shown in FIG. 4C, in a third mode of operation 440, a filter assembly (e.g., first filter assembly 128 as shown) can be configured for hyperspectral operation, such as by filtering and transmitting light in more wavelength ranges than in red/green/blue operation. For example, as shown in FIG. 4C, the first filter assembly 128 is configured to use four filters corresponding to a four wavelength ranges 442 (400 nm-475 nm), 444 (500 nm-575 nm), 446 (600 nm-675 nm), and 448 (700 nm-750 nm).

Figure 4D:
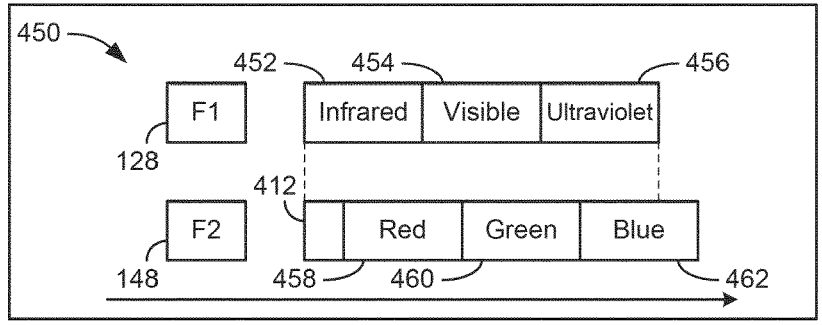

As shown in FIG. 4D, in a fourth mode of operation 450, the first filter assembly 128 can be configured to operate in wavelength ranges outside the visible spectrum, while the second filter assembly 148 transmits light within the visible spectrum. For example, the second filter assembly 148 can correspondingly transmit light within the visible spectrum at timings determined such that the light received outside the visible spectrum appears to a viewer within the visible spectrum.

In various embodiments, modes of operation can be combined. For example, combination of wavelength ranges as shown in FIG. 4B or hyperspectral operation as shown in FIG. 4C can be combined with operation in wavelength ranges outside the visible spectrum a shown in FIG. 4D, such as for increasing the specificity of wavelength ranges, and thus increasing the specificity of colors perceived by a user. For example, hyperspectral operation can be combined with operation in wavelength ranges outside the visible spectrum, such as by associating three visible wavelength ranges of the second filter assembly 148 with the visible light transmitted by the first filter assembly 128, a fourth visible wavelength range of the second filter assembly 148 with infrared light transmitted by the first filter assembly 128, and a fifth visible wavelength range of the second filter assembly 148 with ultraviolet light transmitted by the first filter assembly 128.

In some embodiments, a night vision color assembly or kit is configured to be retrofit to an analog night vision device, such as an analog night vision device including an objective lens (e.g., objective lens 124), a viewing device (e.g., viewing device 144), and a light tube optically coupled to the objective lens 124 and the viewing device 144 (e.g., light amplification assembly 160). For example, a night vision color assembly can include processing electronics 110, first filter assembly 128, and second filter assembly 148. The first filter assembly 128 can be configured to be optically coupled to (e.g., positioned adjacent to, fit on) the objective lens 124. The second filter assembly 148 can be configured to be optically coupled to (e.g., positioned adjacent to, fit on) the viewing device 144 and to the first filter assembly 128.

Figure 5:
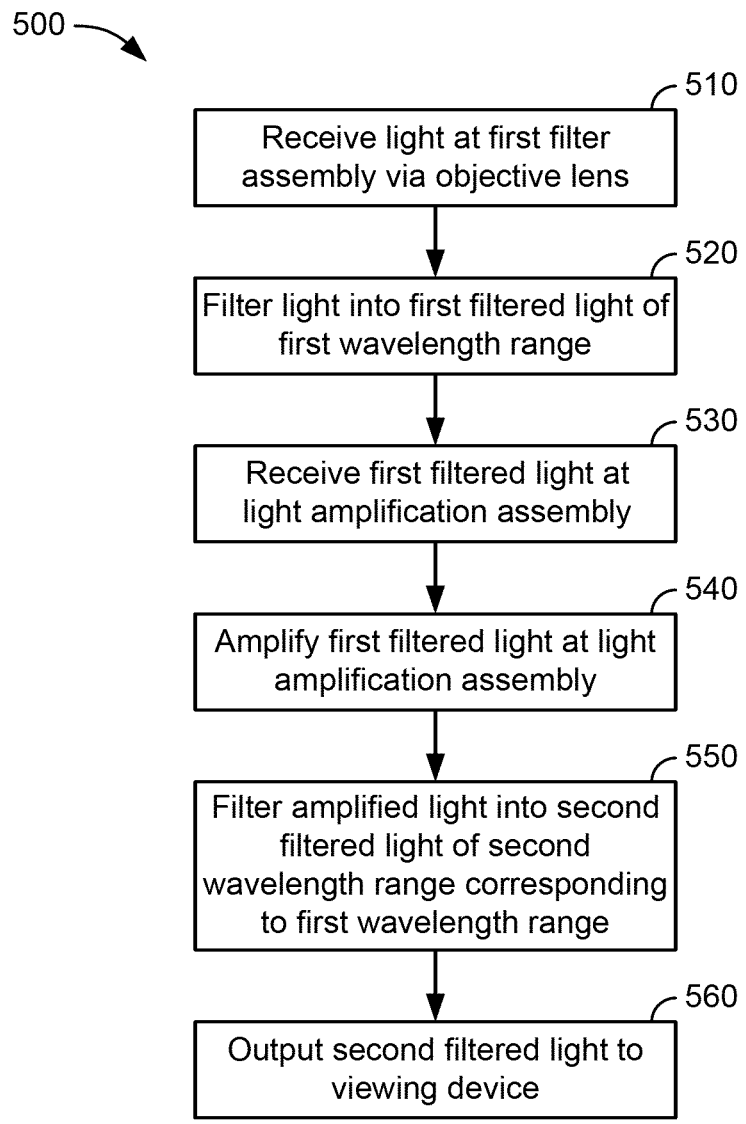
FIG. 5 is a diagram of an exemplary embodiment of a method of providing night vision color according to the inventive concepts disclosed herein.

Referring now to FIG. 5, an exemplary embodiment of a method 500 of providing night vision color according to the inventive concepts disclosed herein may include one or more of the following steps. The method can be performed by various embodiments of night vision color systems and apparatuses as disclosed herein.

A step 510 may include receiving light at a first filter assembly 128 via an objective lens 124. The light can be received from a remote source, such as an object to be identified. The first filter assembly 128 can receive light of various wavelength ranges, including wavelength ranges within a visible spectrum and outside of a visible spectrum.

A step 520 may include filtering the light received by the first filter assembly 128 into first filtered light of a first wavelength range. The first filter assembly 128 can open, activate, or otherwise enable a first filter to transmit light having photons with wavelengths within the first wavelength range. The first filter assembly 128 can receive a first control signal indicating the first wavelength range or the first filter to be used and determine the first filter to be used based on the first control signal. In some embodiments, filtering the light by the first filter assembly 128 further includes filtering the light into first filtered light of one of a first plurality of first wavelength ranges based on the first control signal, and filtering the light by the second filter assembly 148 further comprises filtering the light into second filtered light of one of a second plurality of second wavelength ranges based on the second control signal. In some embodiments, the first plurality of first wavelength ranges includes more than three wavelength ranges (e.g., for hyperspectral operation).

A step 530 may include receiving the first filtered light at a light amplification assembly 160. The light amplification assembly 160 can be optically coupled between the first filter assembly 128 and the second filter assembly 148, such that the first filtered light received by the second filter assembly 148 can be amplified by the light amplification assembly 160. A step 540 may include amplifying the first filtered light into amplified light at the light amplification assembly 160.

A step 550 may include filtering the amplified light into second filtered light of a second wavelength range corresponding to (e.g., coordinated with, synchronized with) the first wavelength range at a second filter assembly 148. The second filter assembly 148 can be similar to the first filter assembly 128, can be optically coupled to the light amplification assembly 160, and can receive the amplified light amplified at the light amplification assembly 160. The second filter assembly 148 can receive a second control signal indicating the second wavelength range or a second filter to be used and determine the second filter to be used based on the second control signal. For example, the second control signal can indicate that a red filter should be opened in order to transmit red light. In some embodiments, the first wavelength range is at least partially outside of a visible range, and the second wavelength range overlaps with a visible range.

A step 560 may include outputting (e.g., transmitting) the second filtered light to a viewing device 144. For example, the second filtered light can be outputted via the viewing device 144 for perception by a user.

In some embodiments, the method 500 includes transmitting at least one of the first control signal or the second control signal at timings based on gain information indication amplification of the first filtered light by the light amplification assembly 160. In some embodiments, the method 500 includes retrieving the gain information from a lookup table.

In some embodiments, the method 500 includes generating each of the first control signal and the second control signal such that the first filter assembly 128 transmits all light received via the objective lens 124 as the first filtered light and the second filter assembly 148 transmits all of the first filtered light as the second filtered light.

In some embodiments, the method 500 includes outputting the second filtered light by the second filter assembly 148 in at least two discrete wavelength ranges, and generating the second control signal such that a wavelength of a perceived color of the second filtered light is not included in either of the at least two discrete wavelength ranges. For example, the second control signal can be generated such that a red filter is open for twice as long as a green filter, and the perceived color is of an orange wavelength.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for night vision color, comprising:
   an objective lens;
   a viewing device;
   a control circuit configured to transmit control signals for controlling a wavelength range of light filtered by a filter assembly;
   a first filter assembly optically coupled to the objective lens, the first filter assembly configured to receive light via the objective lens and filter the light into a first filtered light of a first wavelength range based on a first control signal received from the control circuit;
   a light amplification assembly optically coupled to the first filter assembly, the light amplification assembly configured to receive the first filtered light and amplify the first filtered light into amplified light; and
   a second filter assembly optically coupled to the light amplification assembly and to the viewing device, the second filter assembly configured to receive the amplified light, filter the amplified light into second filtered light of a second wavelength range based on a second control signal received from the control circuit, the second wavelength range corresponding to the first wavelength range, and output the second filtered light to the viewing device.

2. The system of claim 1, wherein the first filter assembly is further configured to filter the light received via the objective lens into first filtered light of one of a first plurality of first wavelength ranges based on the first control signal, and the second filter assembly is further configured to filter the first filtered light into second filtered light of one of a second plurality of second wavelength ranges based on the second control signal.

3. The system of claim 2, wherein the first filter assembly is configured to filter light into first filtered light of the first plurality of wavelength ranges such that the system is configured for hyperspectral operation.

4. The system of claim 1, wherein the light amplification assembly comprises a light tube configured to amplify the first filtered light, wherein the control circuit is further configured to transmit at least one of the first control signal or the second control signal at timings based on gain information indicating amplification by the light tube of the first filtered light.

5. The system of claim 4, wherein the control circuit includes a memory device including a lookup table of gain information, and the control circuit is further configured to retrieve the gain information from the lookup table.

6. The system of claim 1, wherein the first filter assembly and the second filter assembly are each configured to operate at a refresh rate greater than or equal to 360 Hz and less than or equal to 1 KHz.

7. The system of claim 1, wherein the first filter assembly and the second filter assembly are each configured to operate in a fully transmissive state.

8. The system of claim 1, wherein the second filter assembly is configured to output the second filtered light in at least two discrete wavelength ranges, and the control circuit is further configured to generate the second control signal such that a wavelength of a perceived color of second filtered light is not included in either of the at least two discrete wavelength ranges.

9. The system of claim 1, wherein the first wavelength range is at least partially outside of a visible range, and the second wavelength range overlaps with a visible range.

10. A method of providing night vision color, comprising:
receiving light at a first filter assembly optically coupled to an objective lens via the objective lens;
filtering the received light by the first filter assembly into a first filtered light of a first wavelength range based on a first control signal;
receiving the first filtered light at a light amplification assembly optically coupled to the first filter assembly;
amplifying the first filtered light into amplified light at the light amplification assembly;
receiving the amplified light at a second filter assembly optically coupled to the light amplification assembly;
filtering the amplified light by the second filter assembly into second filtered light of a second wavelength range based on a second control signal, the second wavelength range corresponding to the first wavelength range; and
outputting the second filtered light to a viewing device optically coupled to the second filter assembly.

11. The method of claim 10, wherein:
filtering the light by the first filter assembly further comprises filtering the light into first filtered light of one of a first plurality of first wavelength ranges based on the first control signal; and
filtering the light by the second filter assembly further comprises filtering the light into second filtered light of one of a second plurality of second wavelength ranges based on the second control signal.

12. The method of claim 11, wherein the first plurality of first wavelength ranges includes more than three wavelength ranges.

13. The method of claim 10, further comprising transmitting at least one of the first control signal or the second control signal at timings based on gain information indicating amplification of the first filtered light by a light tube of the light amplification assembly.

14. The method of claim 13, further comprising retrieving the gain information from a lookup table.

15. The method of claim 10, wherein the first filter assembly and the second filter assembly are each configured to operate at a refresh rate greater than or equal to 360 Hz and less than or equal to 1 KHz.

16. The method of claim 10, further comprising generating each of the first control signal and the second control signal such that the first filter assembly transmits all light received via the objective lens as the first filtered light and the second filter assembly transmits all of the first filtered light as the second filtered light.

17. The method of claim 10, further comprising outputting the second filtered light by the second filter assembly in at least two discrete wavelength ranges, and generating the second control signal such that a wavelength of a perceived color of the second filtered light is not included in either of the at least two discrete wavelength ranges.

18. The method of claim 10, wherein the first wavelength range is at least partially outside of a visible range, and the second wavelength range overlaps with a visible range.

19. An assembly for night vision color, comprising:
a control circuit configured to transmit control signals for controlling a wavelength range of light filtered by a filter assembly;
a first filter assembly configured to be optically coupled to an objective lens of an analog night vision device, the first filter assembly configured to receive light via the objective lens and filter the light into a first filtered light of a first wavelength range based on a first control signal received from the control circuit; and
a second filter assembly configured to be optically coupled to a light amplification assembly of the night vision device and to a viewing device of the night vision device, the light amplification assembly configured to amplify the first filtered light into amplified light, the second filter assembly configured to receive the amplified light, filter the amplified light into second filtered light of a second wavelength range based on a second control signal received from the control circuit, the second wavelength range corresponding to the first wavelength range, and output the second filtered light to the viewing device.

20. The assembly of claim 19, wherein the first filter assembly is further configured to filter the light received via the objective lens into first filtered light of one of a first plurality of first wavelength ranges based on the first control signal, and the second filter assembly is further configured to filter the first filtered light into second filtered light of one of a second plurality of second wavelength ranges based on the second control signal.

* * * * *